United States Patent Office 2,712,030
Patented June 28, 1955

2,712,030

HALOGENATED SULFONYL HALIDES

Percy B. Polen, Chicago, Ill., assignor to Arvey Corporation, Chicago, Ill., a corporation of Illinois No Drawing. Application January 22, 1954,
Serial No. 405,658

3 Claims. (Cl. 260—543)

This invention relates to the production of new halogenated sulfonyl halides which are useful as pesticidal materials. More specifically, this invention relates to sulfonyl chlorides and sulfonyl fluorides of 1,2,3,4,7,7,-hexachloro-5-phenyl-bicyclo-(2.2.1)-2-heptene.

The compositions of the present invention have the structure

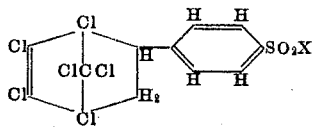

wherein X is selected from the group consisting of chlorine and fluorine.

The above compositions are useful as insecticidal materials against a variety of insect pests, and they are especially useful as insecticidal impregnants for woolen goods. Damage to carpets, woolen clothing, blankets, and padding by carpet bettles and cloths moth larvae is substantially reduced and minimized by the use of the products of the present invention as impregnants.

In addition to the aforementioned uses the products of the present invention have utility as fungistatic compounds.

The product of the present invention may be prepared by reacting hexachlorocyclopentadiene and styrene in a Diels-Alder manner and reacting the adduct thus obtained with a halosulfonic acid selected from the group consisting of chlorosulfonic acid and fluorosulfonic acid and recovering therefrom the corresponding sulfonyl halide derivative of said Diels-Alder adduct.

The starting material is readily obtained by heating equimolar quantities of hexachlorocyclopentadiene and styrene at a temperature of about 165° C. until reaction is complete. The crude product is purified by crystallization from methanol.

The adduct thus obtained is termed 5-phenyl-1,2,3,4,7,7-hexachlorobicyclo-2.2.1) - 2 - heptene. This material is then reacted with a halosulfonic acid to prepare the monosulfonyl halide derivative.

The preferred ratio of reactants is about 10 moles of halosulfonic acid per mole of adduct. The use of solvents is not necessary to prepare the compositions of the present invention, but any anhydrous inert solvent may be used, if desired.

The presence of water is undesirable and precautions should be taken to prevent contamination of the reactants or reaction mixture with water in any form since decomposition of the halosulfonic acid will result and the yield of product substantially reduced.

For the chlorosulfonation reaction temperatures of from −10° C. to about 60° C. are suitable. For the fluorosulfonation reaction temperatures of from about room temperature to about 150° C. are suitable.

Pressure is not a critical factor in the preparation of the present compounds and the reaction may be carried out at normal atmospheric pressure in substantially open vessels as is preferred, or, if desired, pressures above or below atmospheric pressure may be utilized.

The time required to produce the present compositions varies inversely with the temperature utilized. Accordingly, at the more elevated temperatures a reaction time of about two hours is substantially sufficient, while at the lower temperatures periods of reaction of about ten hours are necessary.

The following examples will illustrate specifically a method of preparing the products of the present invention.

Example I

Preparation of 5-(p-chlorosulfonylphenyl)-1,2,3,4,7,7-hexachlorobicyclo-(2.2.1)-2-heptene:

In a 100 cc., 3-necked flask equipped with a reflux condenser, stirrer, and thermometer, 32 g. (0.29 mole) of chlorosulfonic acid was reacted with 10 g. (0.027 mole) of hexachlorocyclopentadiene-styrene adduct for six hours at 0–5° C. The excess acid was decomposed by pouring the contents of the flask into about 250 g. of cracked ice. The solid product which precipitated was removed by filtration, washed with water, and dried 48 hours over sodium hydroxide in a vacuum desiccator. The dry solid weighing 10.5 g. was crystallized from heptane at 0° C. and again from benzene at 0–5° C. The thus purified product melted at 163.5–165° C.

|  | Percent C | Percent H | Percent Cl |
|---|---|---|---|
| Analysis of purified product | 32.63 | 1.43 | 51.97 |
| Calculated for $C_{13}H_7Cl_7SO_2$ | 32.84 | 1.49 | 52.20 |

Example II

Preparation of 5-(p-fluorosulfonylphenyl)-1,2,3,4,7,7-hexachlorobicyclo-(2.2.1)-2-heptene:

Fluorosulfonic acid (50 ml.) and 5-(phenyl)-1,2,3,4,-7,7-hexachlorobicyclo-(2.2.1)-2-heptene (75.4 g. 0.2 mole) were placed in a 250 ml. flask and heated with atmospheric steam. The heating with stirring was continued for 1½ hours. A solid material separated from the reaction mixture. The liquid was discarded and the solid material was washed with hot water by decantation and dissolved in chloroform. The chloroform solution was washed successively with water, saturated $NaHCO_3$ solution, and dried over anhydrous $MgSO_4$. The solution was then concentrated by vacuum distillation and hexane added. The mixed solvent was cooled and the crystalline product recovered. Further purification was by recrystallization from hexane. The pure products melted at 161.5–163° C.

|  | Percent C | Percent H | Percent Cl |
|---|---|---|---|
| Analysis of Product | 34.71 | 1.39 | 46.35 |
| Calculated for $C_{13}H_7Cl_6SO_2F$ | 34.02 | 1.54 | 46.35 |

The compositions of the present invention may be applied to material to protect against insect attack in a variety of ways. Emulsions, wettable powders, solvent solutions, fogs, baits, and dusts are suitable methods of application for the products of the present invention. In addition, these compounds may be applied in conjunction with other insecticides and synergists.

I claim:
1. As a new composition of matter a compound having the structure:
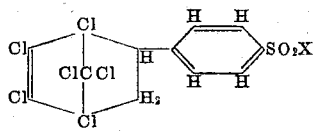
where X is selected from the group consisting of chlorine and fluorine.
2. As a new composition of matter a compound having the structure:
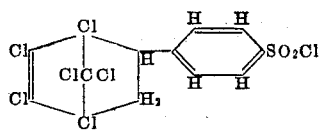
3. As a new composition of matter a compound having the structure:
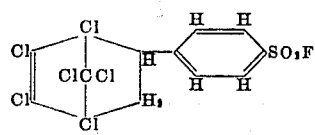
No references cited.